United States Patent
Park (10) Patent No.: US 7,658,387 B2
(45) Date of Patent: Feb. 9, 2010

(54) REINFORCED ELASTOMERIC SEAL

(75) Inventor: Edward H Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 11/167,458

(22) Filed: Jun. 27, 2005

(65) Prior Publication Data

US 2006/0290070 A1   Dec. 28, 2006

(51) Int. Cl.
    *F16J 15/32* (2006.01)
(52) U.S. Cl. ........................ 277/559; 277/576
(58) Field of Classification Search ............. 277/549, 277/559, 576
    See application file for complete search history.

(56) References Cited

U.S. PATENT DOCUMENTS

| | | | |
|---|---|---|---|
| 2,710,290 A * | 6/1955 | Safford et al. ............. 524/506 |
| 2,927,908 A * | 3/1960 | Konkle et. al. ............. 524/506 |
| 3,019,206 A | 1/1962 | Robb |
| 3,037,954 A | 6/1962 | Gessler et al. |
| 3,105,827 A | 10/1963 | Kaufman |
| 3,538,028 A | 11/1970 | Morgan |
| 3,787,341 A | 1/1974 | Aron |
| 3,884,877 A | 5/1975 | Kolb |
| 4,035,565 A | 7/1977 | Apotheker et al. |
| 4,094,949 A | 6/1978 | Yokokawa et al. |
| 4,202,555 A | 5/1980 | Becker et al. |
| 4,287,320 A | 9/1981 | Kolb |
| 4,311,628 A | 1/1982 | Abdou-Sabet et al. |
| 4,328,140 A | 5/1982 | Singletary et al. |
| 4,386,170 A * | 5/1983 | Monroe .................. 523/210 |
| 4,419,499 A | 12/1983 | Coran et al. |
| 4,450,263 A | 5/1984 | West |
| 4,451,542 A | 5/1984 | Ishida et al. |
| 4,530,881 A | 7/1985 | Santoso et al. |
| 4,553,761 A | 11/1985 | Blesing et al. |
| 4,572,516 A | 2/1986 | Symons et al. |
| 4,596,855 A * | 6/1986 | Stewart .................. 525/199 |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,713,418 A | 12/1987 | Logothetis et al. |
| 4,748,204 A | 5/1988 | Kawashima et al. |
| 4,787,991 A | 11/1988 | Morozumi et al. |
| 4,812,357 A | 3/1989 | O'Rell et al. |
| 4,822,061 A | 4/1989 | Kammeraad |
| 4,844,485 A | 7/1989 | Antonini et al. |
| 5,006,594 A | 4/1991 | Rees |
| 5,018,749 A | 5/1991 | Forch |

(Continued)

FOREIGN PATENT DOCUMENTS

EP    0132583    2/1985

(Continued)

OTHER PUBLICATIONS

Solvay Solexis, Micronized Powders: Polymist F5A, Jan. 6, 2005, 1 page.*

(Continued)

*Primary Examiner*—Vishal Patel
(74) *Attorney, Agent, or Firm*—Ronald W. Wangerow; Harness, Dickey & Pierce, PLC (57) ABSTRACT

A dynamic seal is provided which is made of a processable rubber composition containing a matrix of vulcanized elastomeric material with powder filler dispersed therein. In a preferred embodiment, the elastomeric material contains a micro powder which has repeating units derived from tetrafluoroethylene. The micro powder has a median particle size of between 1 and 50 µm.

21 Claims, 4 Drawing Sheets

U.S. PATENT DOCUMENTS

| | | | |
|---|---|---|---|
| 5,095,072 A | 3/1992 | Kobayashi et al. |
| 5,206,293 A | 4/1993 | Sakai et al. |
| 5,209,499 A | 5/1993 | Ruff, Jr. et al. |
| 5,217,137 A | 6/1993 | Andrews |
| 5,219,931 A | 6/1993 | Siol et al. |
| 5,326,111 A | 7/1994 | Hatch |
| 5,331,040 A | 7/1994 | Lee |
| 5,354,811 A | 10/1994 | Kamiya et al. |
| 5,370,404 A | 12/1994 | Klein et al. |
| 5,371,143 A | 12/1994 | Novak et al. |
| 5,384,374 A | 1/1995 | Guerra et al. |
| 5,391,610 A | 2/1995 | Comert et al. |
| 5,397,832 A | 3/1995 | Ellul |
| 5,427,387 A | 6/1995 | Johnston |
| 5,457,158 A | 10/1995 | Caporiccio et al. |
| 5,459,202 A | 10/1995 | Martinez et al. |
| 5,548,028 A | 8/1996 | Tabb |
| 5,585,152 A | 12/1996 | Tamura et al. |
| 5,700,866 A | 12/1997 | Tabb |
| 5,713,577 A | 2/1998 | Lannert et al. |
| 5,723,544 A | 3/1998 | Lee |
| 5,747,588 A | 5/1998 | Mann |
| 5,758,881 A | 6/1998 | Stanley |
| 5,792,348 A | 8/1998 | Eisinga |
| 5,910,544 A | 6/1999 | Ozawa et al. |
| 5,962,589 A | 10/1999 | Matsumoto et al. |
| 6,054,537 A | 4/2000 | Shimizu et al. |
| 6,066,697 A | 5/2000 | Coran et al. |
| 6,114,441 A | 9/2000 | Spohn et al. |
| 6,147,158 A | 11/2000 | Chmielewski |
| 6,160,053 A | 12/2000 | Enokida et al. |
| 6,162,385 A | 12/2000 | Grosse-Puppendahl et al. |
| 6,303,870 B1 | 10/2001 | Nazaryan et al. |
| 6,310,141 B1 | 10/2001 | Chen et al. |
| 6,312,639 B1 | 11/2001 | Ertle et al. |
| 6,407,174 B1 | 6/2002 | Ouhadi |
| 6,409,177 B1 | 6/2002 | Johnston |
| 6,410,630 B1 | 6/2002 | Hoover et al. |
| 6,429,249 B1 | 8/2002 | Chen et al. |
| 6,437,030 B1 | 8/2002 | Coran et al. |
| 6,485,256 B1 | 11/2002 | Iketani |
| 6,500,374 B1 | 12/2002 | Akioka et al. |
| 6,520,507 B2 | 2/2003 | Pataille et al. |
| 6,531,568 B1 | 3/2003 | Shibuya et al. |
| 6,624,251 B1 | 9/2003 | Chmielewski |
| 6,630,231 B2 | 10/2003 | Perez et al. |
| 6,649,217 B1 * | 11/2003 | Gust .................. 427/248.1 |
| 6,649,704 B2 | 11/2003 | Brewer et al. |
| 6,656,831 B1 | 12/2003 | Lee et al. |
| 6,663,966 B2 | 12/2003 | Mhetar |
| 6,729,624 B1 | 5/2004 | Johnston |
| 6,737,479 B2 | 5/2004 | Faulkner |
| 6,743,876 B2 | 6/2004 | Wille et al. |
| 6,860,486 B2 * | 3/2005 | Hacker et al. ............ 277/553 |
| 6,945,537 B2 | 9/2005 | Guillerme et al. |
| 7,022,769 B2 | 4/2006 | Park |
| 2002/0113066 A1 | 8/2002 | Stark et al. |
| 2002/0122928 A1 | 9/2002 | Botrie et al. |
| 2002/0158421 A1 | 10/2002 | Johnston |
| 2002/0198320 A1 | 12/2002 | Chmielewski et al. |
| 2003/0026995 A1 | 2/2003 | Duchesne et al. |
| 2003/0138655 A1 | 7/2003 | Watanabe et al. |
| 2003/0144409 A1 | 7/2003 | Kassa et al. |
| 2003/0166780 A1 | 9/2003 | Shimizu et al. |
| 2004/0045635 A1 | 3/2004 | Bandyopadhyay et al. |
| 2004/0048983 A1 | 3/2004 | Hochgesang et al. |
| 2004/0183702 A1 | 9/2004 | Nachtigal et al. |
| 2004/0260023 A1 | 12/2004 | Park et al. |
| 2005/0155690 A1 | 7/2005 | Park |
| 2005/0165168 A1 | 7/2005 | Park |
| 2005/0167928 A1 | 8/2005 | Park et al. |
| 2005/0171282 A1 | 8/2005 | Park |
| 2005/0222337 A1 | 10/2005 | Park |
| 2005/0272872 A1 | 12/2005 | Park |
| 2005/0275565 A1 | 12/2005 | Nachtigal et al. |
| 2005/0281973 A1 | 12/2005 | Park |
| 2005/0288434 A1 | 12/2005 | Sugiura et al. |
| 2006/0003127 A1 | 1/2006 | Park et al. |
| 2006/0004126 A1 | 1/2006 | Park et al. |
| 2006/0004142 A1 | 1/2006 | Park et al. |
| 2006/0124889 A1 | 6/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2007/0004862 A1 | 1/2007 | Park et al. |
| 2007/0004865 A1 | 1/2007 | Park |
| 2008/0149881 A1 | 6/2008 | Park |
| 2008/0157439 A1 | 7/2008 | Park et al. |

FOREIGN PATENT DOCUMENTS

| | | |
|---|---|---|
| EP | 0148719 | 7/1985 |
| EP | 0239707 | 10/1987 |
| EP | 0168020 | 10/1989 |
| EP | 0432911 | 6/1991 |
| EP | 0254307 | 12/1991 |
| EP | 0 356 619 B1 | 4/1992 |
| EP | 0304843 | 3/1993 |
| EP | 0 431 325 B1 | 10/1993 |
| EP | 0681113 | 11/1995 |
| EP | 0714944 | 6/1996 |
| EP | 1209203 | 5/2002 |
| EP | 1 046 841 B1 | 5/2003 |
| GB | 1357904 | 6/1974 |
| JP | 58-032655 | 2/1983 |
| JP | 62-011767 | 1/1987 |
| JP | 62-236841 | 10/1987 |
| JP | 05-186606 | 7/1993 |
| JP | 2000-079928 | 3/2000 |
| JP | 2001-336679 | 12/2001 |
| WO | WO 00/11073 | 3/2000 |
| WO | WO 01/48077 | 7/2001 |
| WO | WO 01/98405 | 12/2001 |
| WO | WO 02/070929 | 12/2002 |

OTHER PUBLICATIONS

Solay Solexis, Aerospace-Seals and Gaskets, Apr. 24, 2003, 1 page.*
Solay Solexis, by product Line, Jun. 2, 2003, 2 pages.*
Solay Solexis, Micronized Powders: Polymist F5, 1 page.*
"Fluorine-Containing Polymers" Encyclopedia of Polymer Science & Engineering, vol. 7, Second Edition (1987). (pp. 256-267).
"Polyurethanes" Encyclopedia of Polymer Science & Engineering, vol. 13, Second Edition (Date Unknown). (pp. 274-278).
Webpage: "Dyneon™ Fluorothermoplastics" Accessed from 3M Manufacturing and Industrial and Downloaded May 8, 2003. (2 pages).
"Viton® Fluoroelastomer, A Product of DuPont Dow Elastomers", Technical Information, DuPont Dow Elastomers, Copyright 1988.
"AFLAS™ The Fluoroelastomer," Asahi Glass Company, Product Information, Apr. 11, 2003. (8 pages).
Webpage: Tetrafluoroethylene-Propylene Rubber, Date Unknown. (3 pages).
Schmiegel, Walter W., "A Review of Recent Progress in the Design and Reactions of Base-Resistant Fluoroelastomers", DuPont Dow Elastomers, IRC, Jul. 2003.
Moore, Michael J. "Silanes as Rubber-to-Metal Bonding Agents," 160th Meeting of the Rubber Division, American Chemical Society, Cleveland, Ohio, Paper No. 105, (2001). (17 pages).
Viton® Fluoroelastomer: Viton Extreme ETP-600S Technical Information (Formerly designated VTR-8710), DuPont Dow Elastomers (Date Unknown). (6 pages).
Material Safety Data Sheet "DuPont™ TPV 60A01 and 80A01", C.S. Wong, (Sep. 18, 2001). (9 pages).

OTHER PUBLICATIONS

DuPont "Grades for Customer Evaluation" —TPV 60A and TPV 80A. (3 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Sasol: Sasol Olefins and Surfactants available at www.sasoltechdata.com. (20 pages).

* cited by examiner

EDAX/SEM – Fluorine (F) Mapping (ACM with PTFE Powder)

REINFORCED ELASTOMERIC SEAL

This invention relates to seals and, more particularly, relates to materials used to form annular seals of the type to be mounted on a rotating shaft, such as, a wheel oil seal installed between a rotating shaft and outer surrounding stationary housing of a motor vehicle.

BACKGROUND OF THE INVENTION

Dynamic gaskets are typically formed of cured elastomeric materials have a desirable set of physical properties typical of the elastomeric state. These gaskets typically show a high tendency to return to their original sized and shape following removal of a deforming force, and they retain physical properties after repeated cycles of stretching, including strain levels up to 1000%. Based on these properties, the materials are generally useful for making dynamic seal such as seals and gaskets.

In today's automobile engines, the high temperatures of use have led to the development of a new generation of lubricants containing a high level of basic materials such as amines. Seals are often in contact with such fluids during use, and are subject to a wide variety of challenging environmental conditions, including exposure to high temperature, contact with corrosive chemicals, and high wear conditions during normal use. Accordingly, it is desirable to make seals from materials that combine elastomeric properties and stability or resistance to the environmental conditions.

To meet the demands of the new lubricant technology, seals using fluorocarbon elastomers have been developed that are highly resistant to the basic compounds found in the lubricating oils and greases. Specifically seals formed of cured elastomers based on copolymers of tetrafluoroethylene and propylene have met great commercial success. The additives necessary to achieve this resistance, however, often reduce mechanical properties of the seal.

It would be desirable to provide an elastomeric or rubber composition seal that would combine a high level of chemical resistance with improved material properties. It would further be desirable to provide methods for formulating chemically resistant rubbers having such advantageous properties.

SUMMARY OF THE INVENTION

The present invention provides dynamic seal assemblies for installation between first and second relatively movable members that are rotationally or slidably movable, or otherwise relatively movable. The seal has an outer portion for fixed engagement with the first member and a seal extending from the outer portion. The seal is configured to sealingly engage the second member. In some embodiments, the dynamic seal can be installed between an inner rotating shaft and outer non-rotating housing.

In one embodiment of the invention, the seal is made of a processable rubber composition containing a matrix of vulcanized elastomeric material dispersed therein. The elastomeric material comprises a synthetic, non-crystalline fluorine or hydrocarbon-containing polymeric material that exhibits elastomeric properties when crosslinked or vulcanized. In a preferred embodiment, the elastomeric material contains a micro powder which has repeating units derived from tetrafluoroethylene, and optionally one or more additional fluorine-containing monomers. In another, the micro powder is PTFE and has a median particle size of between 1 and 50 μm. In one embodiment, vulcanized elastomeric material matrix forms a continuous phase and the micro particles are evenly dispersed therein.

A method for making a dynamic seal rubber composition is disclosed. The method combines a curative, an elastomeric material as described above, and a PTFE micro powder material, and heating the mixture at a temperature and for a time sufficient to effect vulcanization of the elastomeric material, while mechanical energy is applied to mix the mixture during the heating step. The dynamic seals may be readily formed from the rubber compositions according to conventional processes such as compression molding.

Further areas of applicability of the present invention will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

It should be noted that the figures set forth herein are intended to exemplify the general characteristics of the apparatus, materials and methods among those of this invention, for the purpose of the description of such embodiments herein. These figures may not precisely reflect the characteristics of any given embodiment, and are not necessarily intended to define or limit specific embodiments within the scope of this invention.

DETAILED DESCRIPTION OF THE FIGURES

The following description of the preferred embodiments is merely exemplary in nature and is in no way intended to limit the invention, its application, or uses. The following definitions and non-limiting guidelines must be considered in reviewing the description of this invention set forth herein.

The headings (such as "Introduction" and "Summary,") and sub-headings (such as "Elastomeric Material") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Processable rubber compositions are provided that contain a vulcanized elastomeric material and functional filler dispersed in a thermoplastic matrix. The vulcanized elastomeric material is the product of vulcanizing, crosslinking, or curing a fluorocarbon and hydrocarbon elastomer. The processable rubber compositions may be processed by conventional thermoplastic techniques to form shaped articles having physical properties that make them useful in a number of applications calling for elastomeric properties.

Figures 1, 2:
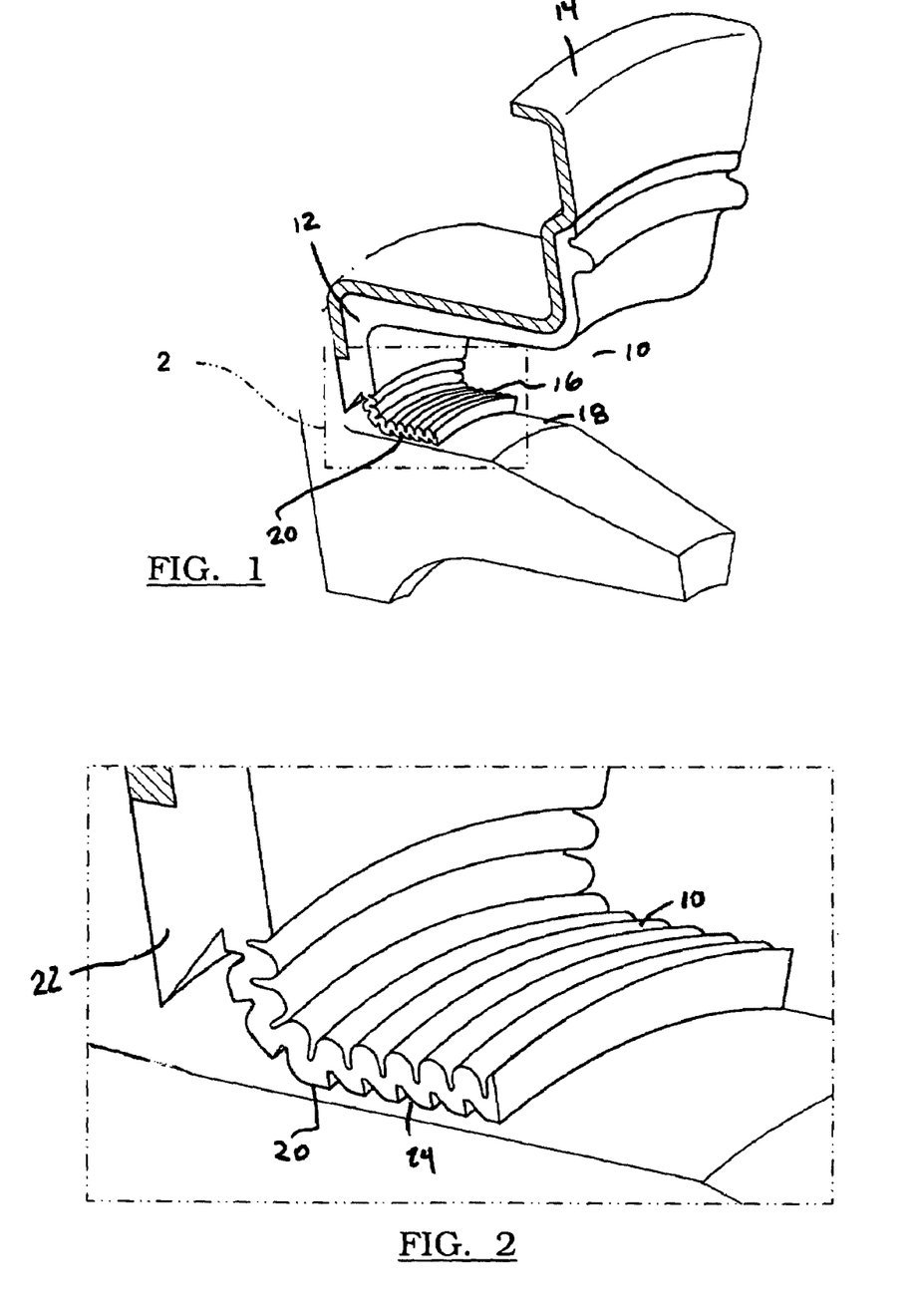
FIG. 1 is a perspective views of a dynamic seal in accordance with the teachings of the present invention.
FIG. 2 is a side view of the seal shown in FIG. 1.
Figure 3:
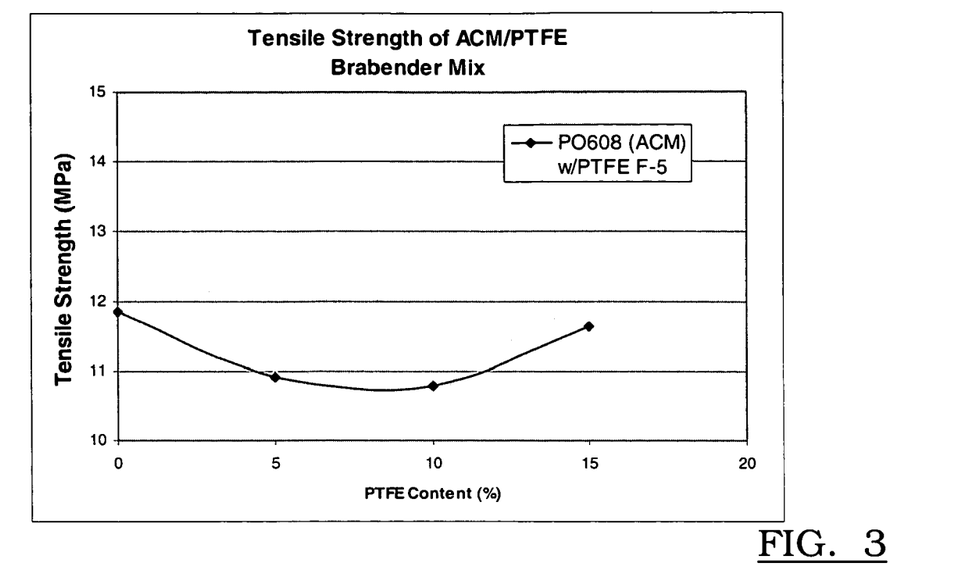
FIGS. 3-6 are graphs describing material properties of various materials.
Figure 4:
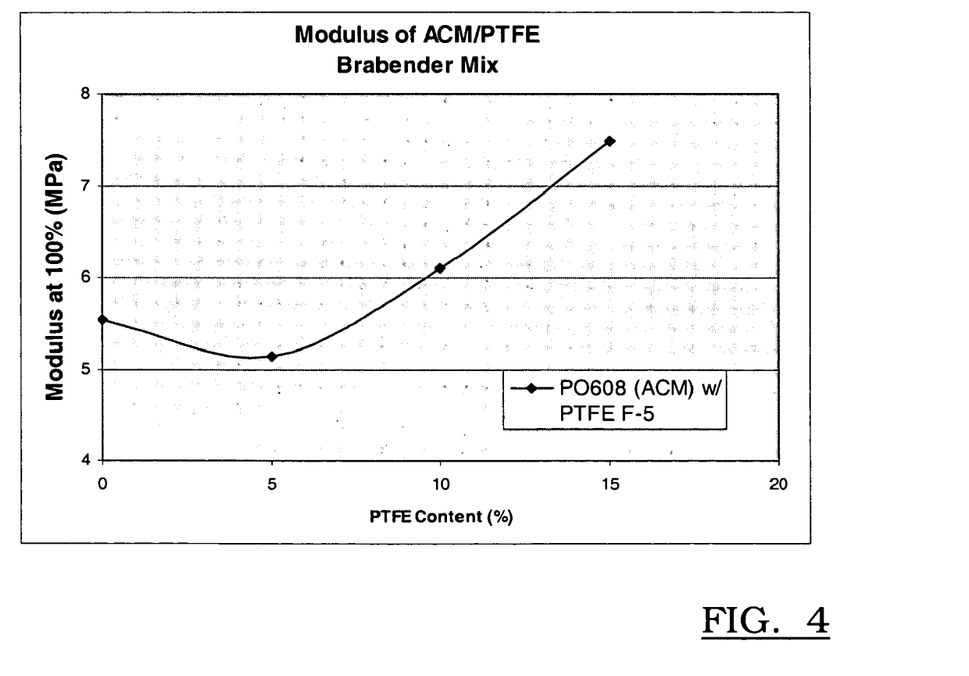
Figure 5:
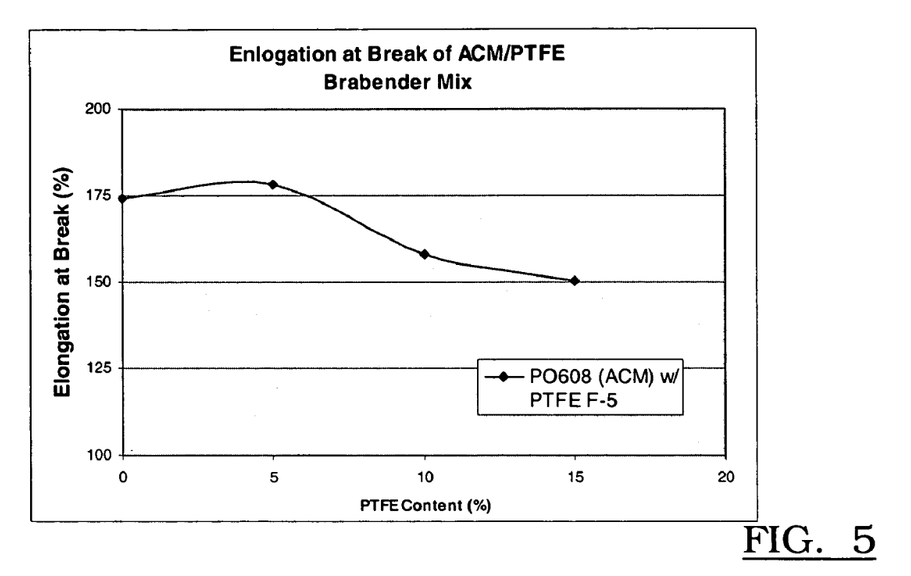
Figure 6:
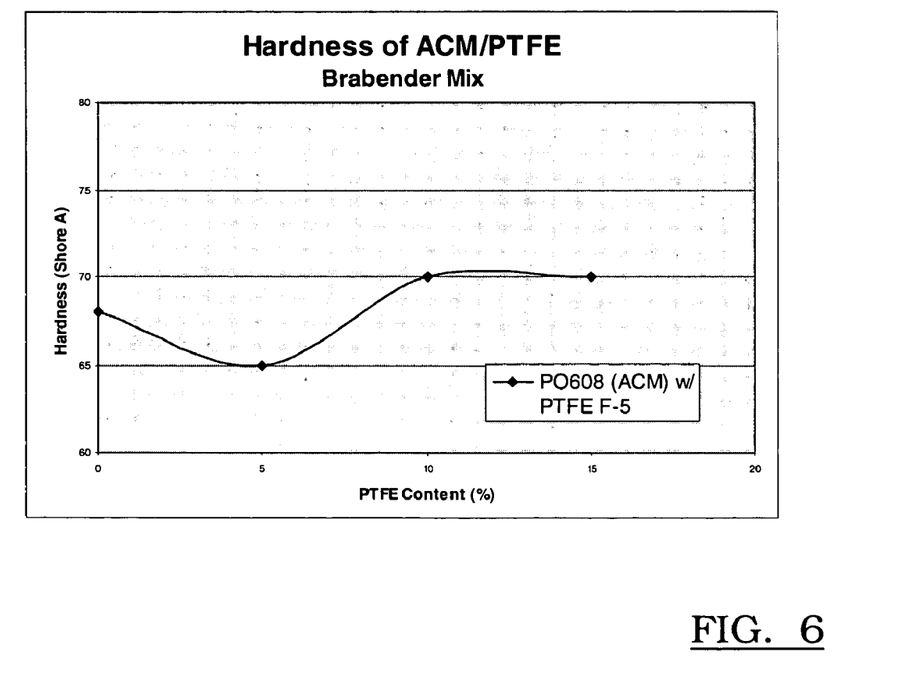
Figure 7A:
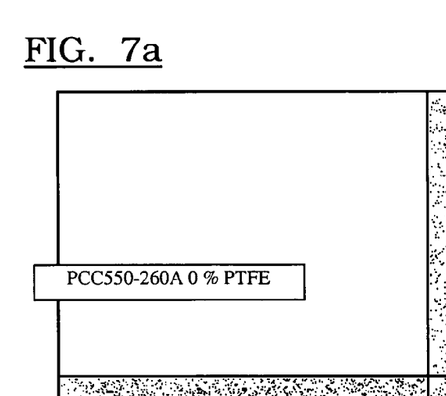
FIGS. 7a-7d represent EDAX/SEM-Fluorine (F) Mapping (ACM with PTFE Micronized Powder).
Figure 7B:
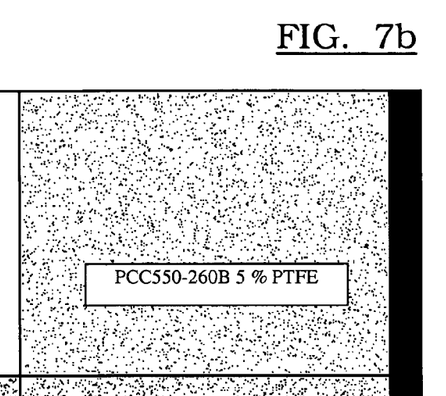
Figure 7C:
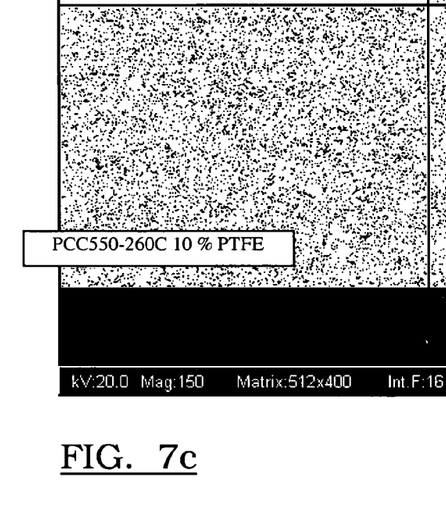
Figure 7D:
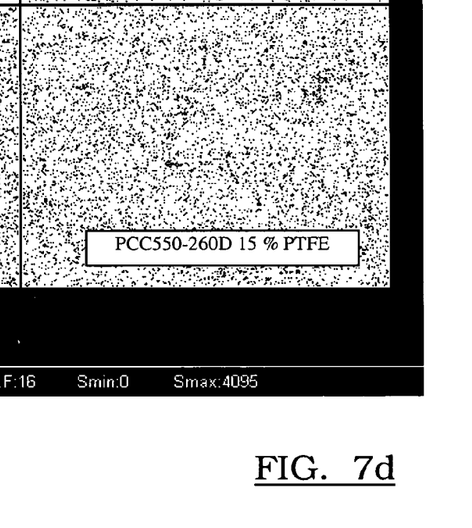

FIGS. 1 and 2 are perspective views of one exemplary embodiment of a dynamic seal 10 in accordance with the teachings of the present invention. The dynamic seal 10 has a first ring 12 for fixed engagement with the housing 14 which is coupled to an annular radial seal 16 extending from the first ring 12 into sliding contact with the shaft 18. The annular radial seal 16, which is configured to slidably engage the rotating shaft 18. It should be stressed, however, that the seal 10 is shown only for purposes of illustrating an example of the invention, and that the invention is also applicable to applications where one member moves relative to another member in a slidable manner, a slidable and rotational manner, or in other types of relatively movable manners.

As seen in FIG. 1, the dynamic seal 10 can have a bearing surface 20 which interfaces with the rotating shaft 18. Additionally shown is an optional stop block 22 which prevents adverse movement of the seal against the rotating shaft 18 during installation or rotation. The length of the bearing surface 20 is between 1 and 99%, and preferably 25-75% of the length.

As can be seen in FIG. 2, the dynamic seal 10 can have a bearing surface 20 which is substantially variegated or articulated. In this regard, a spiral or circular groove or grooves 24 are formed onto a portion of the bearing surface 20. It is envisioned that there can be between 5 and 200 grooves per inch, and these grooves would cover between 10 and 90%, and preferably 25-75% of the flat bearing surface. The number of spiral grooves which contact with the shaft surface is between 1 and 10, and preferably between 1 and 3 grooves in contact with the shaft.

In various embodiments, the dynamic seal 10 is formed of a processable rubber compositions including a vulcanized elastomeric material in a matrix having a dispersed micro powder filler phase. The vulcanized elastomeric material is the product of vulcanizing, crosslinking, or curing an elastomer. The filler powder is made of a tetraflouroethylene having a median diameter of between about 5 and 50 mm. The processable rubber compositions may be processed by conventional techniques to form dynamic seal having physical properties that make them useful in a number of applications calling for elastomeric properties. Preferred fluorocarbon and hydrocarbon elastomers include commercially available FKM, ACM, AEM, EPDM, NBR, HNBR, silicone, polyurethane, and natural rubbers.

Optionally, the elastomeric matrix can be formed of thermoplastic vulcanizates (TPV) having a multi-phase structure, wherein the phases are generally intimately mixed. The vulcanized elastomer phase particles are dispersed within the TPV matrix phase. At least one phase is made of a material that is hard at room temperature but fluid upon heating. Another phase is a softer material that is rubber like at room temperature. These include, but are not limited to FNGP's FKM-TPV, DuPont's ETPV, Zeon's Zeotherm, Dow-Corning's TPSiV, AES's Santoprene, DSM's Santoprene.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by (A-B)n, where A represents the hard segments and B the soft segments as described above. Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-methyl styrene/polybutadiene/poly-methyl styrene, poly-methyl styrene/polyisoprene/poly-methyl styrene, and polyethylene/polyethylene-co-butylene/polyethylene.

Non-limiting examples of thermoplastic elastomers having a (A-B)n repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

FIGS. 3-6 and Tables 1 and 2 represent the material properties for various ACM rubbers and varying amounts of PTFE micro powder filler. While Table 1 represents the material properties before any aging test, Table 2 represents the material properties after an oil immersion test. As can be seen from both tables, there is a substantial degradation of the unmodified material after the immersion test. The modified materials show less reduction of material properties caused by the environmental aging test. As can be seen, the material properties of mixtures at 0, 5, 10, and 15 phr PTFE micro powder (Polymist™ F-5 micronized PTFE powder by Solvay Solexis) were evaluated. There was not a substantial change in the tensile strength, elongation at break, or hardness for the ACM rubber and a 15% PTFE mix. It was, however, found that there is a measurable change in modulus at 50% for the ACM/15% PTFE mix.

TABLE 1

Physical Properties
(ACM with PTFE F-5 Powder Filler Average Particle Size (5.5 μm))

|  | ACM/PTFE—A | ACM/PTFE—B | ACM/PTFE—C | ACM/PTFE—D |
|---|---|---|---|---|
| PTFE F-5 Powder (phr) | 0 | 5 | 10 | 15 |
| Tensile Strength (%) | 11.85 | 10.91 | 10.80 | 11.65 |
| Modulus at 50% (%) | 5.53 | 5.14 | 6.10 | 7.48 |
| Elongation at Break (%) | 174 | 178 | 158 | 150 |
| Hardness (Shore A) | 68 | 65 | 70 | 70 |

Table 2 represents changes in material properties when the various materials are subjected to a fluid immersion test with SF105G fluid. As can be seen, the ACM rubber without PTFE degrades significantly when immersed in the SF105G fluid at 125° C. for seventy hours. The addition of even 5 phr PTFE micro powder substantially reduces the degradation of the elastomeric material. The addition of 15 phr PTFE to the ACM rubber cuts in half the adverse effects of the high temperature fluid immersion while not significantly degrading the material properties of the mixture.

TABLE 2

Fluid Immersion Test
(SF 105 G, 125° C., 70 hours)

|  | ACM with 0 phr PTFE (F-5) Powder | ACM with 5 phr PTFE (F-5) Powder | ACM with 10 phr PTFE (F-5) Powder | ACM with 15 phr PTFE (F-5) Powder |
|---|---|---|---|---|
| Hardness (%) | −15 | −9 | −9 | −7 |
| Tensile Strength (%) | −40 | −15 | −12 | −14 |
| Modulus at 50% (%) | −17 | −7 | −5 | −12 |
| Elongation at Break (%) | −27 | −15 | −12 | −11 |
| Volume Change (%) | 6 | 4 | 3 | 4 |

In various embodiments, plasticizers, extender oils, synthetic processing oils, or a combination thereof are used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear polyolefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, functional filler and curative, the processable rubber compositions of this invention may include other additives such as stabilizers, processing aids, curing accelerators, pigments, adhesives, tackifiers, waxes, and mixtures thereof. These additives may be added to the composition at various times, and may also be pre-mixed as a curative package. As used herein, a curative package may include any combination of additives as known in the art, or could simply only contain curing agent. The properties of the compositions and articles of the invention may be modified, either before or after vulcanization, by the addition of ingredients that are conventional in the compounding of rubber, thermoplastics, and blends thereof.

The compositions of the present invention comprise a functional filler. As referred to herein, a "functional filler" is a material which is operable in a composition of the invention to improve one or more properties of the composition. Such properties include one or more chemical or physical properties relating to the formulation, function or utility of the composition, such as physical characteristics, performance characteristics, applicability to specific end-use devices or environments, ease of manufacturing the composition, and ease of processing the composition after its manufacture. Functional fillers useful herein include those selected from the group consisting of lubricating fillers, reinforcing fillers, thermal conductive fillers, electrical conductive fillers, physical extender fillers, and mixtures thereof. Fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber, and mixtures thereof. In various embodiments, the compositions comprise from about 0.1 to about 50% by weight of the composition. Optionally, the compositions comprise from about 1 to about 40%, or from about 10 to 30% of the filler.

The addition of lubricating fillers improves the abrasion and wear characteristics of the fluorocarbon and hydrocarbon elastomers. Lubricating fillers, as used herein, include materials having characteristic crystalline habit, which may cause the filler material to shear into thin, flat plates operable to readily slide over one another, thus having an antifriction or lubricating effect. Non-limiting examples of fluorocarbon and hydrocarbon elastomer wear additives, include additives selected from the group consisting of PTFE powder, silicon powder, graphite powder, calcium meta-silicate, polyimide powder, $MoS_2$ powder, carbon fiber, boron fiber, aramid fiber, silicone oil, and mixtures thereof. In various embodiments, certain wear additives may exhibit compatibility issues with elastomers, plastics, and elastomer/plastic compounds, including thermoplastic vulcanizate compositions containing cured fluorocarbon and hydrocarbon elastomers. Poor adherence to the matrix may yield less desirable physical properties. The modification and coating of a certain wear additive surfaces improves the effectiveness of the additive by enhancing the affinity among the additives, elastomers and plastics. Various embodiments of the present invention use chemically treated or coated wear additives for bonding enhancement and to improve adhesion of the additives in a matrix. Application of silane or maleic anhydride based bonding agents to the surface of the wear additive is one non-limiting example of this chemical approach used to enhance compatibility with the elastomer/plastic matrix. Various embodiments include the use of epoxy silane coated calcium silicate (Nyad 10222). Other embodiments includes the use of silane coated Kevlar® fiber, or a functionally equivalent high tensile strength aromatic aramid fiber, for bonding enhancement.

Reinforcing fillers improve physical properties such as overall strength, hardness, abrasion resistance, compression set, tensile strength, tensile modulus and elongation at break. The reinforcing fillers can be either in fiber or powder form. As used herein, powder form is defined as a solid dry functional filler material of small particle size, in some embodiments ranging down to colloidal dimensions, and includes granules, flakes, dust, and mixtures thereof. Some non-limiting examples of reinforcing powder fillers may include carbon black powder, glass bead, polyimide powder, $MoS_2$ powder, steel powder, brass powder, and aluminum powder. In one embodiment, the addition of carbon black, along with extender oil, preferably prior to dynamic vulcanization, is particularly preferred. Non-limiting examples of carbon black fillers include SAF black, HAF black, SRP black and Austin black. Some non-limiting examples of reinforcing fiber fillers include fumed silica, natural or synthetic fibers, glass fibers, carbon fibers, boron fibers, polyester, acrylic, colored pigments, polyimide, polyamide, and aramid fibers. Preferred reinforcing fibers include glass fibers, carbon fiber, and high tensile strength aromatic polyamide fibers. One embodiment of a polyamide fiber useful herein is commercially available as Kevlar®, marketed by E. I. du Pont de Nemours and Company. In various embodiments, certain reinforcing fillers, such as glass fiber, carbon fiber, Kevlar® fiber, boron fiber, PTFE fiber and other ceramic fibers, may exhibit compatibility issues with elastomers, plastics, and elastomer/plastic compounds, including thermoplastic vulcanizate compositions containing cured fluorocarbon and hydrocarbon elastomers. Poor adherence to the matrix may yield undesirable physical properties. The modification and coating of a certain filler surfaces improves the effectiveness of the filler by enhancing the affinity among the fillers, elastomers and plastics. The surface treatment of fillers by chemical or physical means helps to improve interfacial bonding to the matrix. In preferred embodiments, certain fillers such as aramid fibers, carbon fibers, or glass fibers, are etched, chemically treated, or have a coating applied to improve the compatibility with the matrix. This bonding enhancement technology results in more homogeneous compounds. Specialized coatings on fiber fillers improve the bonding wherein fillers migrate to the surface and contact metal or plastic thereby triggering bonding.

The addition of conductive fillers enhances the thermal and electrical conductivity properties of the fluorocarbon and hydrocarbon elastomers. Conductive fillers, as used herein, include materials operable to enable the transfer or heat or electric current from one substance to another when the two substances are in contact with one another. Crystalline solids are good thermal and electrical conductors, especially metals and alloys. Non-limiting examples of conductive fillers include conductive grades of carbon fiber or powder, aluminum powder, brass powder, steel powder, and other conductive metals.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include $Ca(OH)_2$, MgO, CaO, and ZnO.

The compositions are homogenous blends of two phases that are sufficiently compatible that the compositions may readily be formed into shaped articles having sufficient elastomeric properties, such as tensile strength, modulus, elongation at break, and compression set to be industrially useful as seals, gaskets, O-rings, hoses, and the like. In one aspect, the rubber compositions are made of two-phases where the matrix forms a continuous phase, the vulcanized elastomeric material is in the form of particles forming a non-continuous, disperse, or discrete phase, and the functional filler is dispersed in the matrix. In another aspect, the elastomeric material, functional filler and the matrix form co-continuous phases.

As previously discussed, other functional fillers may also be present in a powder form. Likewise, the powder form functional filler may be present in the form of particles in a continuous thermoplastic elastomer matrix. The powder form functional filler particles preferably have a particle size of between about 0.01 to 1,000 µm, more preferably, between about 0.1 to 100 µm.

The rubber composition of the invention may be made by dynamic vulcanization of a fluorocarbon and hydrocarbon elastomer in the presence of the PTFE micro powder filler. In this embodiment, a method is provided for making the rubber composition, comprising combining a curative agent, an elastomeric material, the PTFE micro powder to form a mixture. The mixture is heated at a temperature and for a time sufficient to effect vulcanization or cure of the fluorocarbon and hydrocarbon elastomer in the presence of the filler and thermoplastic material. Mechanical energy is applied to the mixture of elastomeric material, curative agent, filler and thermoplastic material during the heating step. Thus, the method of the invention provides for mixing the elastomer, filler, and thermoplastic components in the presence of a curative agent and heating during the mixing to effect cure of the elastomeric component. Alternatively, the elastomeric material and thermoplastic material may be mixed for a time and at a shear rate sufficient to form a dispersion of the elastomeric material in a continuous or co-continuous thermoplastic phase. Thereafter, a functional filler and curative agent may be added to the dispersion of elastomeric material and thermoplastic material while continuing the mixing. Finally, the dispersion is heated while continuing to mix to produce the processable rubber composition of the invention.

The compositions of the invention are readily processable by conventional plastic processing techniques. In another embodiment, shaped articles are provided comprising the cured, fluorocarbon elastomers matrix, and PTFE micro powder filler dispersed in the matrix. Shaped articles of the invention include, without limitation, seals, O-rings, gaskets, and hoses.

In a preferred embodiment, shaped articles with functional fillers prepared from the compositions of the invention exhibit an advantageous set of physical properties that includes a high degree of resistance to the effects of chemical solvents. In these embodiments, it is possible to provide articles for which the hardness, tensile strength, and/or the elongation at break change very little or change significantly less than comparable cured fluorocarbon and hydrocarbon elastomers or other known thermoplastic vulcanizates, when the articles are exposed for extended periods of time such as by immersion or partial immersion in organic solvents or fuels.

The elastomers are generally synthetic, non-crystalline polymers that exhibit rubber-like properties when crosslinked, cured, or vulcanized. As such, the cured elastomers, as well as the compositions of the invention made by dynamic vulcanization of the elastomers, are observed to substantially recover their original shape after removal of a deforming force, and show reversible elasticity up to high strain levels.

Full crosslinking can be achieved by adding an appropriate curative or curative system to the elastomeric material, and vulcanizing or curing the rubber to the desired degree under vulcanizing conditions. In a preferred embodiment, the elastomer is crosslinked by the process of dynamic vulcanization. The term dynamic vulcanization refers to a vulcanization or curing process for a rubber (here a fluorocarbon and hydrocarbon elastomer) contained in a thermoplastic composition, wherein the curable rubber is vulcanized under conditions of sufficiently high shear at a temperature above the melting point of the thermoplastic component. The rubber is thus simultaneously crosslinked and dispersed within the thermoplastic matrix. Dynamic vulcanization is effected by applying mechanical energy to mix the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (typically 120° C.) to about 300° C. or more. Typically, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

FIGS. 7a-7d represent EDAX/SEM-Fluorine Mapping of a ACM matrix with various amounts of PTFE Powder. After dynamic vulcanization, a homogeneous mixture is obtained. The PTFE filler is in the form of small dispersed particles essentially of an average particle size smaller than about 50 μm, preferably of an average particle size smaller than about 25 μm. More typically and preferably, the particles have an average size of about 10 μm or less, preferably about 5 μm. The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases. It is believed such compatibility results from the dynamic vulcanization process and inclusion of functional filler. During the process, the elastomeric matrix is crosslinked or cured while the two phases are being actively mixed and combined. In addition, the higher temperature and the presence of reactive crosslinking agent may lead to some physical or covalent linkages between the two phases. At the same time, the process leads to a finer dispersion of the discrete or co-continuous elastomer phase in the thermoplastic than is possible with simple filling.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the present invention may be manufactured in a batch process or a continuous process. In a batch process, predetermined charges of elastomeric material, PTFE filler powder, functional filler and curative agents, or curative package, are added to a mixing apparatus. In a typical batch procedure, the elastomeric material and PTFE filler powder are first mixed, blended, masticated or otherwise physically combined until a desired particle size of PTFE filler powder is provided in a continuous phase of elastomeric material. When the structure of the compound is as desired, a functional filler and curative agent may be added while continuing to apply mechanical energy to mix the elastomeric material and PTFE powder. Curing is effected by heating or continuing to heat the mixing combination of PTFE and elastomeric material in the presence of the curative agent. When cure is complete, the processable rubber composition may be removed from the reaction vessel (mixing chamber) for further processing.

It is preferred to mix the elastomeric material and PTFE powder at a temperature where the elastomeric material softens and flows. If such a temperature is below that at which the curative agent is activated, the curative agent may be a part of the mixture during the initial particle dispersion step of the batch process. In some embodiments, a curative is combined with the elastomeric and PTFE powder at a temperature below the curing temperature. When the desired dispersion is achieved, the functional filler can be added and the temperature may be increased to effect cure. In one embodiment, commercially available elastomeric materials are used that contain a curative pre-formulated into the elastomer. However, if the curative agent is activated at the temperature of initial mixing, it is preferred to leave out the curative until the desired particle size distribution of the elastomeric material in the thermoplastic matrix is achieved. In another embodiment, curative is added after the elastomeric and PTFE powder are mixed. In a preferred embodiment, the curative agent is added to a mixture of PTFE powder in elastomeric matrix while the entire mixture continues to be mechanically stirred, agitated or otherwise mixed. Further, it is preferred to add any fibrous functional filler as late in the process as feasible, thus minimizing and avoiding unnecessary breakage of fiber filler during the mixing action.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 5 parts by weight PTFE powder, preferably at least about 10 parts by PTFE powder, more preferably at least about 30 parts by weight PTFE powder.

The invention claimed is:

1. A dynamic seal assembly for installation between first and second relatively movable members, said assembly comprising:
an outer portion for fixed engagement with said first member and a radial seal extending from said outer portion and configured to sealingly engage said second member, wherein said radial seal comprises a thermoplastic elastomer dynamic vulcanizate comprising a distributed micronized PTFE powder functional filler, further wherein said vulcanizate comprises a non-continuous, discrete phase elastomeric material dispersed in a continuous phase matrix comprising a thermoplastic material and at least a portion of said micronized PTFE powder is dispersed within said thermoplastic material in said matrix.

2. A dynamic seal assembly according to claim 1, wherein said micronized PTFE powder has a median diameter of between about 1 µm and about 50 µm.

3. A dynamic seal assembly according to claim 2, wherein said median diameter is about 5 µm.

4. A dynamic seal according to claim 1, wherein said radial seal comprises between about 5 and about 30 phr micronized PTFE micropowder.

5. A dynamic seal according to claim 1, wherein said elastomer is selected from the group consisting of available FKM, ACM, AEM, EPDM, NBR, HNBR, silicone, polyurethane, and natural rubbers.

6. A dynamic seal according to claim 4, wherein said elastomer is present at a level of at least about 65% by weight based on the total weight of said elastomer and said thermoplastic polymer.

7. A dynamic seal according to claim 4, wherein said vulcanizate comprises a thermoplastic elastomeric material comprising an amorphous polymer having a glass transition temperature of at least about −40° C.

8. A dynamic seal according to claim 4, wherein said vulcanizate comprises a reactive oligomer material which comprises a semi-crystalline polymer having a melting point of at least about 80° C.

9. A dynamic seal according to claim 1, wherein said radial seal is made by a process comprising the steps of:
combining an uncured or partially cured elastomer, a curative agent capable of reacting with the elastomer to effect cure, and a micronized PTFE powder;
mixing the combination to form a mixture;
applying heat to the combination during the mixing step; and
forming the seal with the mixture.

10. A dynamic seal according to claim 1, wherein said radial seal is made by a process comprising made by a process comprising the steps of:
mixing the elastomer and micronized PTFE powder in the presence of the curative agent;
heating during mixing to effect cure of the elastomeric components.

11. A dynamic seal according to claim 1, wherein said first member is a housing, and said second member is a rotating shaft.

12. A dynamic seal according to claim 1, wherein said first member is a housing, and said second member is a slidable shaft.

13. A dynamic seal assembly for installation between an inner rotating shaft and an outer non-rotating housing comprising:
an annular radial seal extending from the outer non-rotating housing into sliding contact with the inner rotating shaft, said annular radial seal being configured to slidably engage the inner rotating shaft, said annular radial seal having a thermoplastic elastomer dynamic vulcanizate comprising a distributed micronized PTFE powder functional filler, further wherein said vulcanizate comprises a non-continuous, discrete phase elastomeric material dispersed in a continuous phase matrix comprising a thermoplastic material and at least a portion of said micronized PTFE powder is dispersed within said thermoplastic material in said matrix.

14. A dynamic seal assembly according to claim 13, wherein said annular radial seal comprises a bearing surface which contacts the rotating shaft.

15. A dynamic seal assembly according to claim 13, wherein said micronized PTFE powder has a median diameter of between about 1 gm and about 50 μm.

16. A dynamic seal according to claim 14, wherein said bearing surface comprises a variegated surface.

17. A dynamic seal according to claim 16, wherein said variegated surface is a helical spiral groove.

18. A dynamic seal according to claim 13, wherein said annular radial seal comprises between about 1 and 100 phr micronized PTFE powder.

19. A dynamic seal according to claim 13, wherein said annular radial seal comprises between about 5 and 30 phr micronized PTFE powder.

20. A dynamic seal according to claim 17, wherein said elastomer is selected from the group consisting of available FKM, ACM, AEM, EPDM, NBR, HNBR, silicone, polyurethane, and natural rubbers.

21. A dynamic seal according to claim 17, further comprising an additional functional filler.

* * * * *

UNITED STATES PATENT AND TRADEMARK OFFICE
CERTIFICATE OF CORRECTION

PATENT NO. : 7,658,387 B2  
APPLICATION NO. : 11/167458  
DATED : February 9, 2010  
INVENTOR(S) : Edward H. Park et al.

Page 1 of 1

It is certified that error appears in the above-identified patent and that said Letters Patent is hereby corrected as shown below:

Col. 12, line 41-42 (claim 10): "made by a process comprising made by a process comprising" should be -- made by a process comprising --

Col. 13, line 6 (claim 15): "1 gm" should be --1μm --

Signed and Sealed this  
Third Day of May, 2011

David J. Kappos  
*Director of the United States Patent and Trademark Office*